(12) United States Patent
Haje

(10) Patent No.: US 6,578,849 B2
(45) Date of Patent: Jun. 17, 2003

(54) SEALING CONFIGURATION, IN PARTICULAR FOR A ROTARY MACHINE

(75) Inventor: Detlef Haje, Bottrop (DE)

(73) Assignee: Siemens Aktiengesellschaft, Munich (DE)

( * ) Notice: Subject to any disclaimer, the term of this patent is extended or adjusted under 35 U.S.C. 154(b) by 28 days.

(21) Appl. No.: 09/761,595

(22) Filed: Jan. 16, 2001

(65) Prior Publication Data
US 2001/0006278 A1 Jul. 5, 2001

Related U.S. Application Data

(63) Continuation of application No. PCT/DE99/02059, filed on Jul. 2, 1999.

(30) Foreign Application Priority Data

Jul. 15, 1998 (DE) .......................... 198 31 815

(51) Int. Cl.[7] .............................................. F16J 15/54
(52) U.S. Cl. ...................................... 277/389; 277/412
(58) Field of Search ................................. 277/402, 412, 277/549, 561, 575, 387, 389, 391, 393, 413

(56) References Cited

U.S. PATENT DOCUMENTS

| 3,081,821 | A | * | 3/1963 | Hamilton |
| 3,827,702 | A | * | 8/1974 | Winiarz |
| 3,907,309 | A | | 9/1975 | Griffiths |
| 4,378,119 | A | * | 3/1983 | Luxford et al. |
| 4,688,806 | A | * | 8/1987 | Heilala |
| 4,802,679 | A | | 2/1989 | Chen et al. |
| 5,556,112 | A | * | 9/1996 | Brandt |
| 5,743,707 | A | | 4/1998 | Bättig et al. |

FOREIGN PATENT DOCUMENTS

| AT | 362 639 | 10/1980 |
| DE | 35 33 829 A1 | 4/1987 |
| DE | 195 21 229 C1 | 8/1996 |
| EP | 0 611 905 A1 | 8/1994 |
| FR | 2 646 221 | 10/1990 |

OTHER PUBLICATIONS

"Massnahmen zur Modernisierung und Lebensdauerverlängerung an Dampfturbinenkomponenten", Measures for Modernizing and Extending the Life Span of Steam Turbine Components (Bergmann et al.), VGB Kraftwerkstechnik 71, vol. 2, 1991, pp. 116–122.

* cited by examiner

Primary Examiner—Robert J. Sandy
Assistant Examiner—Karlena D Schwing
(74) Attorney, Agent, or Firm—Laurence A. Greenberg; Werner H. Stemer; Ralph E. Locher

(57) ABSTRACT

A sealing configuration is provided for sealing off a first region from a second region through which a fluid can flow and which can be kept at different pressures. The sealing configuration has a deformation region and a sealing surface connected thereto. The sealing surface is spaced apart from an opposing surface by a sealing gap. The width of the sealing gap depends on a deformation of the deformation region as a result of a differential pressure. The sealing configuration preferably serves to seal off a turbine shaft from a turbine casing or a moving blade from a turbine casing.

18 Claims, 7 Drawing Sheets

SEALING CONFIGURATION, IN PARTICULAR FOR A ROTARY MACHINE

CROSS-REFERENCE TO RELATED APPLICATION

This application is a continuation of copending International Application No. PCT/DE99/02059, filed Jul. 2, 1999, which designated the United States and was not published in English.

BACKGROUND OF THE INVENTION

FIELD OF THE INVENTION

The invention relates to a sealing configuration for sealing off a first region from a second region through which a fluid can flow and which can be kept at different pressures. A differential pressure can be produced between the two regions by the different pressures. The invention relates in particular to a sealing configuration that can be used for sealing in rotary machines, such as electrical rotary machines and thermal fluid-flow machines.

A device for non-contact sealing between spaces of different pressure, in particular for a fluid-flow machine in which shaft leadthroughs between spaces of different pressure have to be provided with suitable seals, is described in European Patent Application No. 0 611 905 A1. The specified device is formed of a labyrinth seal in which step-shaped labyrinth gaps are formed between a rotating part and a stationary part. Sealing tips are disposed in the labyrinth gaps on each of the rotating part and the stationary part, as a result of which a high degree of swirling of a medium flowing through is said to be achieved. The sealing tips between the stationary part and the rotating part are disposed as close to one another as possible, so that there is only a slight radial gap. The sealing tips extend radially in such a way that sealing tips of two adjacent steps overlap. A group of sealing tips can be caulked in place in a corresponding groove through the use of a caulking wire.

Various seals for a turbine stage of a steam turbine are specified in an article entitled "Maßnahmen zur Modernisierung und Lebensdauerverlängerung an Dampfturbinenkomponenten" [Measures for Modernizing and Prolonging the Life of Steam Turbine Components] by D. Bergmann, M. Jansen and H. Oeynhausen, in VGB Kraftwerkstechnik 71, 1991, No. 2, pages 116 to 112. FIG. 13 of the article shows relative leakage-steam flows between a guide blade and a turbine rotor. In that case, recesses are made in the guide blade in some embodiments. The lowest relative leakage-steam flow rates are achieved for labyrinth seals in which sealing tips are disposed on the turbine rotor and on the guide blades in an alternate manner in the axial direction. Efficiency losses of a steam turbine plant can be reduced by an improvement in gap sealing between the turbine rotor and the guide blade.

Austrian Patent No. 362 639 shows a non-contact seal between a part rotating in a space to be sealed off and a stationary part. A ring-shaped sealing body surrounds a shaft leading out of a casing. A pressure medium is stored under a pressure T1 in the casing. The sealing body is pressed by the pressure of the pressure medium in the direction of a sealing surface of the shaft. A gap remains between the sealing surface and the sealing body due to pressure chambers. The height of the gap is firmly preset by choke points which reduce the pressure T1 to a lower pressure in the pressure chambers. An end-wall section of the sealing body, which is opposite the sealing surface, is positioned in such a way that possible tilting of the sealing body is automatically compensated for by a tilt-point displacement.

German Published, Non-Prosecuted Patent Application DE 35 33 829 A1 shows a sealing device with a gas-lubricated mechanical surface seal. Two sealing rings lying opposite one another form a sealing gap through which a gaseous medium flows. A gas lubricating film is obtained at a very specific pressure, and that gas lubricating film keeps the two sealing rings at a distance apart at a defined gap width. During a pressure reduction, one of the sealing rings is pushed back into an open position by a spring force.

SUMMARY OF THE INVENTION

It is accordingly an object of the invention to provide a sealing configuration, in particular for a rotary machine, which overcomes the hereinafore-mentioned disadvantages of the heretofore-known devices of this general type and which is used for sealing off two regions through which a fluid can flow that are at different pressure levels in order to reduce a leakage flow from one region into the other region, as may be necessary, for example, in thermal fluid-flow machines or electrical rotary machines.

With the foregoing and other objects in view there is provided, in accordance with the invention, a sealing configuration, comprising first and second regions for conducting a fluid flow and/or being filled with a fluid. The regions are to be sealed-off relative to one another and kept at different pressures forming a differential pressure. An opposing surface and a deformation region are provided. A sealing surface is connected to the deformation region and spaced apart from the opposing surface by a sealing gap. The sealing gap has a height to be set by a deformation of the deformation region as a result of a force exerted by the differential pressure.

The invention is based on the concept that, in pressure-carrying machines, such as fluid-flow machines, in particular steam turbines, different pressure levels of the working medium, for example steam or gas, are to be sealed off from one another, or the working medium is to be sealed off from the ambient medium. In the case of known seals between stationary and rotating parts, non-contact seals are mainly used, in particular in steam turbines, due to the high circumferential velocities and the nature of the sealing task. If there are pressure differences, the non-contact seals have an unavoidable leakage mass flow, which leads to losses in output or efficiency of the pressure-carrying machine. The leakage mass flow is substantially determined by the clearances in the seal, e.g. tip-to-tip seals or a labyrinth seal, and by gap widths in seals without tips. In known seals, those clearances are to be constructed in such a way that the loading cases occurring in the machine can be controlled without damage, i.e. without grazing. For example, that applies during normal operation, cold or hot start, when passing a critical speed, during operation of turning gear, and in the event of plant malfunctions. That is because, in the event of grazing, the clearance would be bridged and the rotating component would touch the stationary component. In order to avoid that in every operating or malfunction situation of the machine, the clearances as a rule are dimensioned too generously for the actual operation, that is when there are stringent tightness requirements. On the contrary, for the dimensioning of the clearance, transient processes and the passing of a critical speed as well as the compensation for any production tolerances in size, form and position are decisive. In addition, a reduction in the clearance in known seals in a steam turbine, at high steam pressures and in the case of slim turbine rotors, could lead to gap excitation, which in turn influences the dynamic behavior and may lead to self-excited vibrations. Furthermore, the leakage mass flows which occur in the current seals through the seals of the blade stages in a steam turbine in cylinder type of construction during the re-entry to the blading space cause disturbances in the inflow to the following blade row, e.g. due to incorrect incident flows.

If the differential pressure changes, the height of the sealing gap is changed by a differential-pressure-controlled sealing configuration so that, in particular when the differential pressure is increasing, the height of the sealing gap, i.e. the clearance, is reduced and a considerable sealing effect is thereby produced. The sealing in that case is effected by an interaction of the sealing surface with the opposing surface, which in particular is axial. A considerable sealing effect is achieved in the process by the functioning mode of the deformation region, which undergoes a deformation, in particular an axial elongation, toward the sealing surface when the differential pressure is applied to the sealing configuration. Furthermore, the change in the spacing between the sealing surface and the opposing surface forms a sealing region through the use of which an improved sealing effect is produced with decreasing height of the sealing gap. In addition, with a decreasing height of the sealing gap, an increasing counterforce, in particular an axial force, against the deformation (elongation) of the deformation region can be produced. As a result, the sealing configuration is not only non-contacting but also self-setting.

In accordance with another feature of the invention, at least one sealing element is provided on the sealing surface and/or on the opposing surface and projects into the sealing gap or the sealing surface and/or the opposing surface. This sealing element is preferably disposed on an outer margin of the sealing surface or the opposing surface toward the first region or toward the second region. The sealing element is preferably disposed on the outer margin toward the region having the lower pressure level. In this case, the sealing element may be constructed, for example, as a gap, a projection or a tip. Appropriate shaping of the sealing surface or of the opposing surface, or a geometrical configuration or a spatially distributed material composition of the sealing surface or of the opposing surface which produces a pressure-controlled elastic deformation and a consequent reduction in the height of the sealing gap, is also regarded as a sealing element. The insertion of a suitable sealing element provides for a self-setting sealing configuration in which an increasing counter force, in particular an axial force, counteracting the deformation of the deformation region arises, with decreasing height of the sealing gap (sealing-gap height). This counterforce, with decreasing height of the sealing gap, increasingly counteracts a further narrowing of the gap. Inter alia, this results from the fact that, at a relatively large height of the sealing gap, the fluid flows between the two regions during a pressure build-up and flows through the gap formed by the sealing surface and the opposing surface. In the process, the flow velocity becomes greater, as the height of the sealing gap and the pressure difference become greater. At a supercritical pressure ratio, the velocity of sound may be reached at the narrowest cross section. Due to physical laws, as specified, for example, in Bernoulli's equation, a reduced static pressure thereby arises in the gap. As a result, the sealing surface is subjected to an action of force (closing force) in the direction of the sealing gap, a factor which leads at least to partial closing of the gap. As the sealing gap becomes narrower, the flow velocity decreases, and the closing force acting on the sealing surface for closing the gap also decreases as a result.

In accordance with a further feature of the invention, the sealing configuration has two sealing elements which are at a distance from one another in the differential-pressure-induced flow direction (main gap direction). One sealing element is preferably disposed in a marginal region facing the region having a lower pressure, and the other sealing element is preferably disposed in a marginal region at the sealing surface or the opposing surface which faces the region having a higher pressure. The sealing element facing the region having a lower pressure preferably leads to greater narrowing of the sealing gap than the sealing element facing the region having a higher pressure. At a reduced height of the sealing gap, the sealing elements disposed on the sealing surface or opposing surface lead to an increase in the pressure in the region of the sealing gap between the two sealing elements. At the same time this results in a reduction in the flow velocity in the sealing gap overall. If the sealing element facing the region having a lower pressure leads to greater narrowing of the sealing gap, the pressure inside the sealing gap approaches the higher pressure. With decreasing height of the sealing gap, this therefore leads to an increase in the counterforce acting on the sealing surface and at the same time to a reduced leakage mass flow.

The sealing configuration can therefore be constructed in a simple manner with regard to construction and material selection, to provide as great a sealing effect as possible within a predeterminable pressure-difference range. In particular, it is possible, within this predeterminable pressure-difference range, for equilibrium to be achieved between the closing force, acting on the sealing surface due to the pressure difference, and the counterforce counteracting the closing force and caused by the gap narrowing. A favorable gap height is set during this equilibrium. As a result, at a smaller pressure difference than the design pressure difference, a somewhat larger gap will arise as compared with the sealing-gap height set in the equilibrium state between the closing force and the counterforce. If there is no pressure difference, the sealing configuration will not be deformed. As a result, the maximum height of the gap is established, and this maximum height, depending on requirements and construction, may be several millimeters for a corresponding machine, in particular in a steam turbine. The sealing configuration therefore has a very narrow clearance, and thus an especially good sealing effect, only at the design pressure difference, in particular during on-load operation of a steam turbine, when there are increased sealing requirements. During the operations heretofore determining the clearance in steam turbines, the sealing configuration has a large clearance, so that grazing of the sealing surface on the opposing surface and thus damage to the machine are avoided.

The sealing surface may be constructed in such a way that it is rigid or flexible (deformable) relative to the design pressure difference. The sealing surface is preferably connected in a rigid or flexible manner through a connection region to the deformation region, in particular to a profile having a U-shaped cross section. The sealing surface may be connected to the deformation region at the region having a lower pressure or at the region having a higher pressure. In a circular-ring-shaped configuration of the sealing surface, this corresponds to a connection at the inside diameter or the outside diameter of the circular ring.

A sealing element may be constructed as a widened portion, a bead, a deformation of the gap-height reduction of the sealing surface, which deformation occurs as a result of the pressure difference, or a sealing strip and/or a sealing tip. One or more sealing elements may be provided both on the sealing surface and on the opposing surface or on both surfaces, in particular in their marginal regions.

In accordance with an added feature of the invention, there is provided a gap-influencing element in addition to or as an alternative to a sealing element. The gap-influencing element is preferably a swirl breaker or a hydrodynamically effective bearing surface. A gap-influencing element allows the flow to be influenced or allows the force equilibrium between the closing force and the counterforce to be influenced in a specific manner. A swirl breaker can be used in particular when the sealing configuration is used for avoiding or reducing gap excitation effects. A hydrodynamically effective bearing surface, which produces a counterforce due to a narrowing media-filled gap, preferably serves to establish the lower limit of the sealing-gap height.

In accordance with an additional feature of the invention, the deformation region, which in particular is movable in the direction of a machine axis, is constructed like a corrugated spring, a bellows, or a series connection of plates subjected to radial bending stress, in particular for enclosing a machine shaft (circular-ring plates). Through application of pressure to the plates on one side as a result of the pressure difference, a deflection occurs, which is of varying magnitude depending on construction and pressure. In this case, the deformation behavior can be implemented for a design pressure difference through the use of analytical computations or commercially obtainable computer programs. Depending on the construction, the calculations are carried out with the margin of the deformation region mounted or clamped. A plurality of plates which are connected one behind the other and form a deformation bellows may be used, in particular, for compensating for relative deformations, as occur in steam turbines, for example. In this case, the individual plates may be connected to one another in a flexible manner at their outer margins or, in particular at high pressure differences, they may be connected to one another in a flexurally rigid manner. It is likewise possible to connect one plate to an adjacent plate in a flexible manner and to another adjacent plate in a flexurally rigid manner. Furthermore, plates having different thicknesses may be provided, in which case, in particular, alternately thick and thin plates may follow one another. The plates are preferably disposed parallel to one another and in particular perpendicular to a machine axis. It is likewise possible to place adjacent plates at an acute angle relative to one another. Of course, both the diameter of the plates across the deformation region and the division, i.e. the distance between two adjacent plates, may vary. In addition to a multiplicity of plates forming a bellows, an individual plate or a plate-shaped component having a sealing surface connected thereto may also be provided.

In accordance with yet another feature of the invention, in particular for use in a rotary machine having a rotating shaft, the sealing surface and the deformation region are constructed in a ring shape, preferably in a circular-ring shape. The sealing gap preferably extends in a sealing plane which, for sealing a radial gap extending along a machine axis, is inclined relative to the machine axis by 70° to 110°. In this case, the sealing gap is preferably perpendicular to the machine axis or to the actual radial gap to be sealed. When the sealing configuration is used, a rotary machine may also be constructed in such a way that a radial gap is dispensed with. This radial gap to be sealed is formed, for example, between a stationary machine component and a rotatable machine component. In this case, the sealing surface is connected either to the stationary machine component or to the rotatable machine component and accordingly the opposing surface is connected to the other respectively machine component.

In accordance with yet a further feature of the invention, the sealing configuration is disposed in a rotary machine, in particular a pump, a turbine, such. as a steam turbine or gas turbine, a compressor of a gas turbine, or in a generator. In this case, the sealing configuration may be connected in series with seals that are already present or may partly or completely replace the latter. When the sealing demands made on conventional seals adjacent the sealing configuration are slight, those conventional seals, in particular for increasing operational reliability, may then be provided with a greater clearance. In this case, the sealing configuration may be used on the side having the higher pressure at a gap to be sealed, so that the pressure inside the gap to be sealed drops, which leads to a reduction in any gap excitation. Deformations caused by existing temperature differences or by transient heat-transfer processes can largely be avoided due to the compact type of construction of the sealing configuration with low mass and the thin-walled construction of the deformation region and the sealing surface. At most slight temperature differences occur over the sealing surface and the deformation region due to the small wall thickness. In addition, in a steam turbine, the steam flowing through the sealing configuration is subjected to choking with only a slight drop in temperature, so that approximately the same temperature is present in front of and behind the sealing configuration. The seal can rapidly follow transient temperature changes due to its comparatively small masses. In addition, even slight radial displacements of the rotating component and the stationary component, which displacements limit the gap to be sealed, do not influence the sealing effect of the sealing configuration.

A ring-shaped deformation region and the sealing surface may be produced by material removal, in particular by machining, by creating or primary forming, by a forming process or by a joining process, as well as by a combination of these methods. The deformation region may be firmly clamped in the stationary machine component or rotating machine component. It is preferably made of a high-temperature-resistant material, in particular a steel, a nickel-base alloy or a cobalt-base alloy. The sealing surface may likewise be made of a high-temperature-resistant material. In order to construct the sealing configuration for achieving as great a sealing effect as possible and equilibrium between the forces (closing force, counterforce) acting on the sealing surface, the following parameters may be varied: diameter of the bellows (circularring diameter, circular-ring thickness); thickness (wall thickness) of the sealing surface and of the plates forming the bellows; clamping of the plate of the bellows, which serves for the fastening; number of plates of the bellows; diameter of the sealing surface; rigidity of the sealing surface; length and diametral position of the sealing gap; type of position; gap narrowing of the sealing elements; and fitting clearance and configuration of the transitions (connection regions) between adjacent plates.

In accordance with a concomitant feature of the invention, in addition to the sealing of a gap formed between a turbine shaft as a rotating machine component and a turbine casing part as a stationary machine component, sealing between a moving blade, in particular a complex moving-blade ring, and the turbine casing, is also made possible in one configuration of the sealing configuration. In this case, the opposing surface is preferably disposed on the moving blade and the sealing surface is preferably firmly connected to the turbine casing through the deformation region. Of course, the sealing configuration may also be disposed between a guide blade, in particular a guide-blade ring, and a turbine shaft.

Other features which are considered as characteristic for the invention are set forth in the appended claims.

Although the invention is illustrated and described herein as embodied in a sealing configuration, in particular for a rotary machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
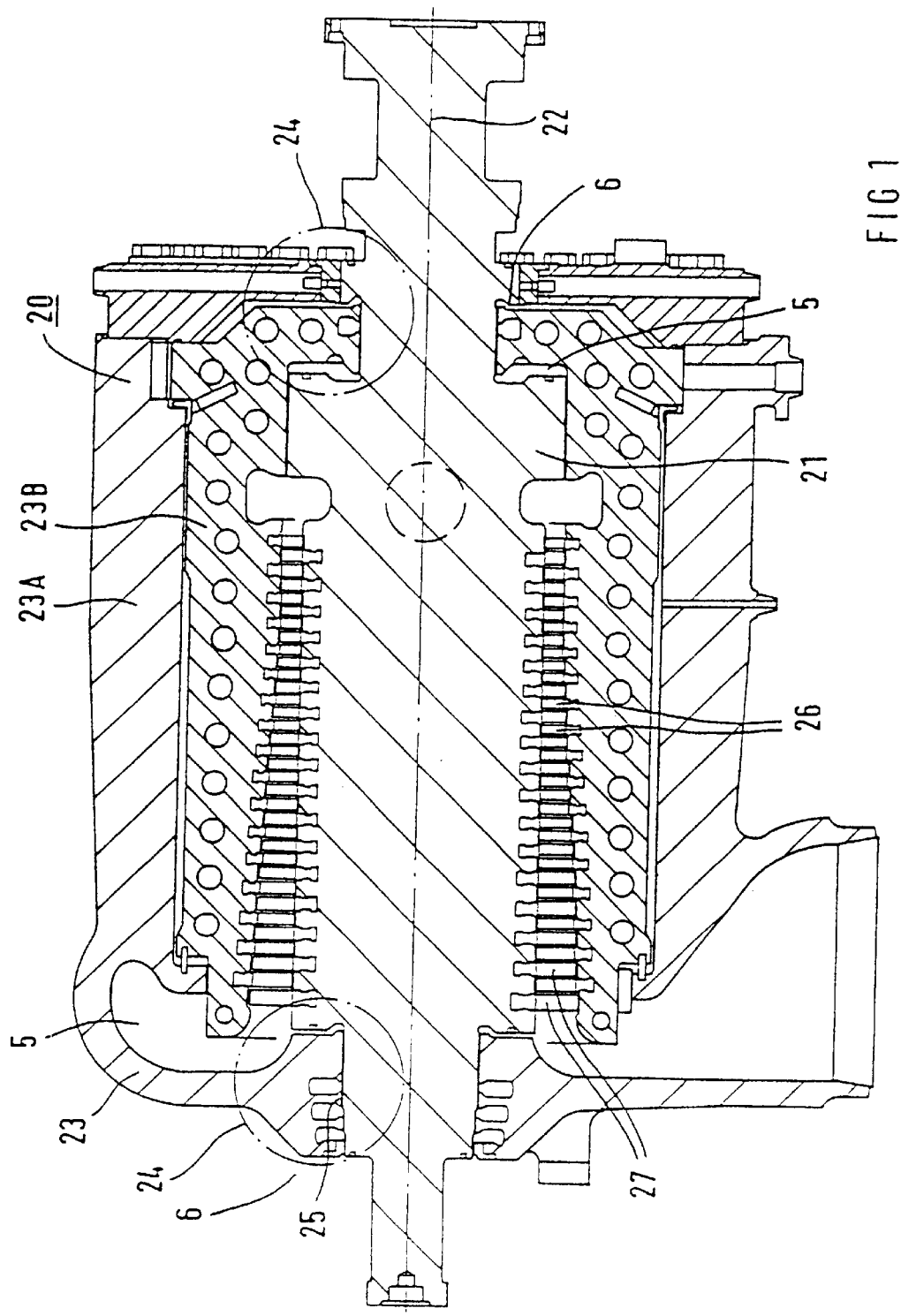
FIG. 1 is a diagrammatic, longitudinal-sectional view of a high-pressure steam turbine.

Referring now in detail to the figures of the drawings, in which reference numerals have the same meaning, and first, particularly, to FIG. 1 thereof, there is seen a longitudinal section of a fluid-flow machine, namely a high-pressure section of a steam turbine 20. The steam turbine 20 has a rotatable machine component, namely a turbine shaft 21, which is directed along a machine axis 22. A turbine casing 23, including an outer turbine casing 23A and an inner turbine casing (guide-blade carrier) 23B, surrounds the turbine shaft 21. The turbine casing 23 adjoins the turbine shaft 21 at two sealing regions 24 disposed at an axial distance from one another, while leaving a respective radial gap 25. The radial gap 25 extends along the machine axis 22 and has a radial extent, so that a ring-shaped cross-sectional area of the radial gap 25 is formed.

Moving blades 27 are disposed on the turbine shaft 21 and guide blades 26 are disposed on the inner turbine casing 23B between the two sealing regions 24. Superheated steam under high pressure flows through between these blades during operation Of the steam turbine 20. A first pressure region 5 having a high pressure of the steam is thus formed in the interior of the turbine casing 23 during operation of the steam turbine 20. This first pressure region 5 adjoins the two sealing regions 24 on the inside. A respective second pressure region 6 having a lower pressure adjoins each of the sealing regions 24 on the outside. Due to the pressure difference between the first pressure region 5 and the respective second pressure region 6, steam flows to a greater or lesser degree from the first pressure region 5 into the respective second pressure region 6 through the radial gap 25, depending on the type of sealing.

Figure 3:
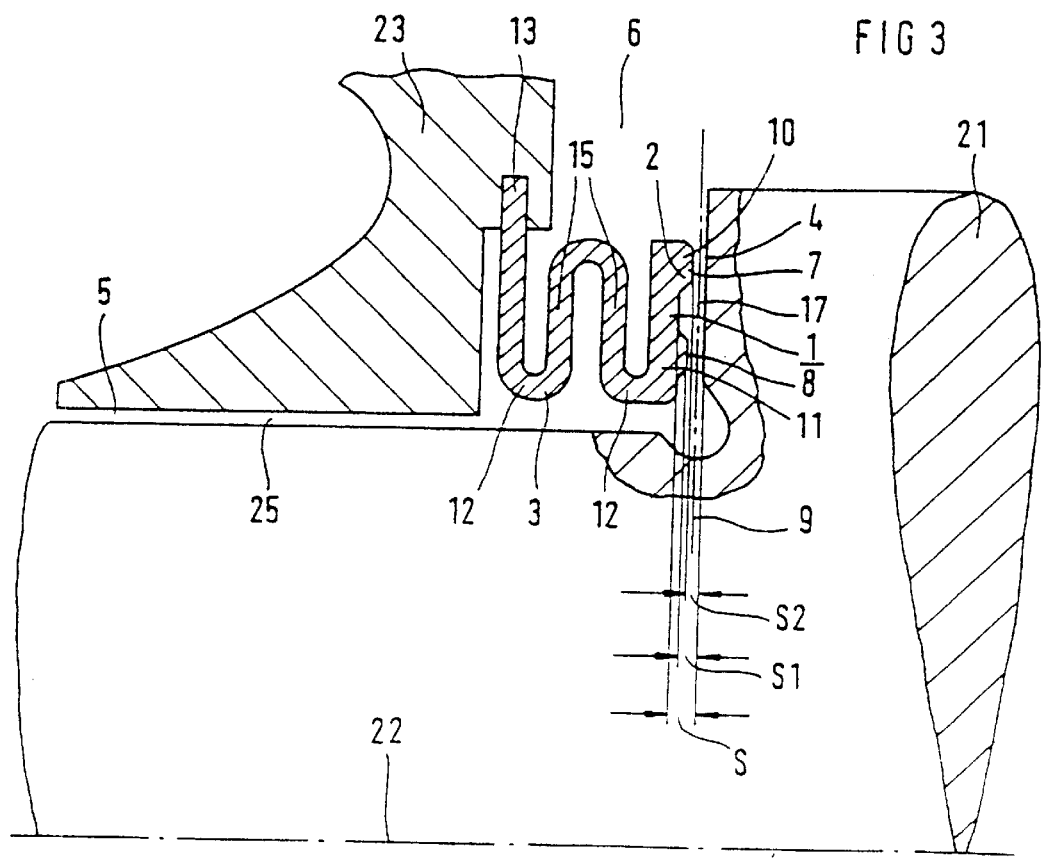
FIG. 3 is a longitudinal-sectional view of a sealing configuration for sealing a turbine shaft.

A sealing configuration 1 having a deformation region 3 is shown in a longitudinal section in FIG. 3. The deformation region 3 extends in the direction of the machine axis 22 and is composed of three circular-ring-shaped plates 15 disposed axially one behind the other. Adjacent plates 15 are connected to one another through a respective connection region 12 curved in a U-shape. The plate 15 disposed at one axial end of the deformation region is firmly connected in a clamping region 13 to the inner turbine casing 23B, i.e. a stationary machine component. A plate-shaped sealing surface 2 is disposed at the other axial end of the deformation region 3 through a connection region 12. The sealing configuration 1, with the sealing surface 2 and the deformation region 3, encloses the turbine shaft 21, i.e. a rotatable, rotating machine component. The turbine shaft 21 extends axially behind the sealing configuration 1 in the radial direction and thus forms an opposing surface 4 axially opposite the sealing surface 2. The sealing surface 2 and the opposing surface 4 form an axial sealing gap 17, which extends along a main gap direction 9 perpendicularly to the machine axis 22. The sealing gap 17 has a maximum height S. An outer sealing element 7, which is disposed at an outer marginal region 10 of the sealing surface 2, projects into the sealing gap 17 and reduces the height S of the sealing gap to a height S2. An inner sealing element 8 is disposed at an inner marginal region 11 of the sealing surface 2. This inner marginal region 11 has a smaller diameter than the outer marginal region 10. The sealing element 8 likewise projects into the gap 17 and reduces the height S of the gap to a height S1. In this case, the height S2 is smaller than the height S1. The inner marginal region 11 is adjoined by a first pressure region 5 having a high pressure of the working medium of the steam turbine, in particular of the steam of the steam turbine 20. The outer marginal region 10 is adjoined by the second pressure region 6 having a pressure which is lower relative to the. first pressure region 5.

An axial pressure deformation of the circular-ring-shaped plates 15 of the deformation region 3 occurs due to the pressure difference between the first pressure region 5 and the second pressure region 6. As a result, the axial height S of the sealing gap 17 is reduced as compared with the state at a lower pressure difference, in particular a pressure difference having the value 0. The height S of the sealing gap 17 is reduced even during relatively large thermal deformations between the turbine shaft 21 and the turbine casing 23 of the steam turbine 20 due to the use of a series connection of the plates 15 in the deformation region 3.

The different reduction in the height S of the gap 17 due to the outer sealing element 7 and the inner sealing element 8 leads to a reduction in the flow velocity of the steam in the sealing gap 17 and at the same time to an increase in the pressure in the sealing gap 17 up to about the value of the pressure of the first sealing region 5. In this way, an axial counterforce is produced on the sealing surface 2, and this counterforce counteracts a closing force exerted on the sealing surface 2 by the pressure difference in the direction of the sealing gap 17 from the deformation region 3.

The sealing configuration 1 is therefore self-setting in the sense that a narrower sealing gap produces a higher counterforce (restoring force). In this way, a small height S of the sealing gap (sealing-gap height), which can be preselected at the design stage, is achieved by an opposed closing force and counterforce (pressure force and sealing force) which are in equilibrium.

A greater height S of the sealing gap 17 is obtained at a smaller pressure difference than the pressure difference prevailing during operation of the steam turbine between the first pressure region 5 and the second pressure region 6. This avoids the risk of the sealing elements 7, 8 grazing against the opposing surface 4 during transient processes and of the critical speed of the steam turbine 20 being passed due to the larger clearance, i.e. the larger height S of the gap 17.

In the exemplary embodiment shown, the connection region 12 of the sealing surface 2 at the deformation region 3 is implemented at the inner marginal region 11 of the sealing surface 2. It goes without saying that the connection region 12 may also be disposed at the outer marginal region 10 of the sealing surface 2. Given an appropriate material selection of the sealing configuration 1, the deformation region 3 may also be attached to the rotatable machine component, that is the turbine shaft 21.

Figure 2:
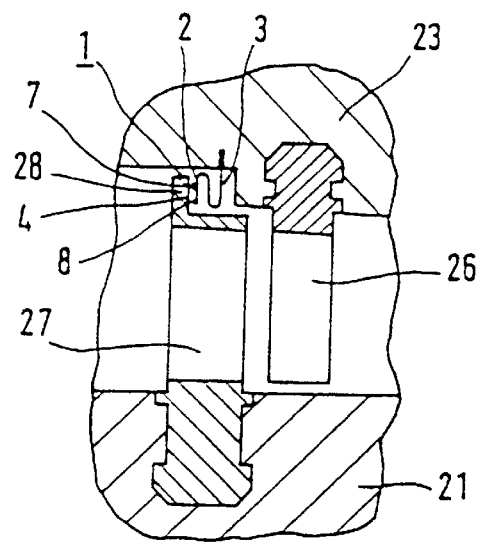
FIG. 2 is an enlarged, fragmentary, longitudinal-sectional view of a turbine stage having a sealing configuration.

A fragmentary, longitudinal section of a steam turbine 20 is shown in FIG. 2. A sealing web 28, which points radially outward and forms an opposing surface 4, is disposed on a moving blade 27, in particular a moving-blade ring. A sealing surface 2 of a sealing configuration 1 is disposed at an axial distance from the opposing surface 4. The sealing surface 2 is likewise radially directed and is connected to an axially movable deformation region 3.

In a similar manner to FIG. 3, the sealing surface 2 has an outer sealing element 7 and an inner sealing element 8. A radial gap between the moving blade 27 and the casing 23 is therefore sealed by the sealing configuration 1. As already described with regard to FIG. 3, the sealing effect is based on a pressure-difference-induced axial expansion (deformation) of the deformation region 3 with simultaneous generation of a counterforce in the sealing gap 17, which is formed between the sealing surface 2 and the opposing surface 4.

Figure 4:
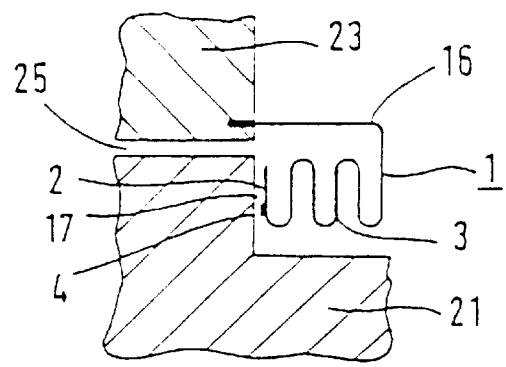
FIG. 4 is a fragmentary, longitudinal-sectional view of a sealing configuration for sealing a gap between machine components ending in the same plane.

A sealing configuration 1 having a deformation region 3 and a sealing surface 2 connected thereto is shown in a longitudinal section in FIG. 4. The sealing configuration 1 serves to seal a radial gap 25 which is formed between a stationary machine component 23 and a rotating machine component 21. The radial gap 25 ends in a plane in which both the stationary machine component 23 and the rotating machine component 21 end at least directly in the surroundings of the radial gap 25. A fastening ring 16, which extends in the axial direction from the radial gap 25, is attached to the stationary machine component 23. After a non-specified axial distance, the fastening ring 16 bends in the radial direction and extends radially beyond the radial gap 25, so that the fastening ring 16 overlaps the rotating machine component 21 in the radial direction. An axially movable deformation region 3, which merges into a sealing surface 2, is disposed at the radial region of the fastening ring 16 in the direction of the radial gap 25. The sealing surface 2 is axially spaced apart from an opposing surface 4 of the rotating machine component 21 through the use of a sealing gap 17. Therefore, an axial sealing gap 17 which can be sealed by the self-setting sealing configuration due to an induced pressure difference, is formed in FIG. 4 in a manner similar to FIGS. 2 and 3. As a result, the radial gap 25 is also sealed.

Figure 5:
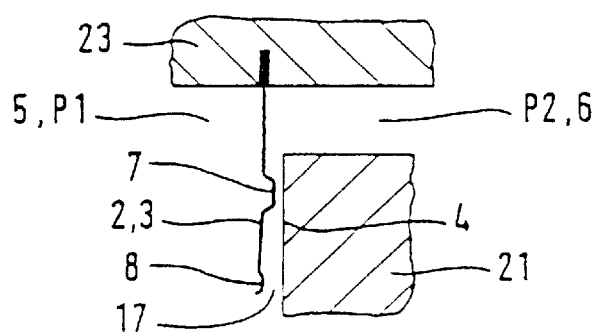
FIG. 5 is a fragmentary, longitudinal-sectional view of a sealing configuration having a deformation region constructed as a sealing surface.

FIG. 5 shows a sealing configuration 1 in which the sealing surface 2 and the deformation region 3 are realized in the form of a single plate or a plate-shaped component. The sealing surface or plate 2 is spaced apart from an opposing surface 4 through the use of a sealing gap 17. The sealing surface 2 and the opposing surface 4 each extend in the radial direction. The sealing surface 2 extends beyond the opposing surface 4 and is firmly connected to a stationary machine component 23. The sealing surface 2 separates a first pressure region 5 having a high pressure P1 from a second pressure region 6 having a lower pressure P2. The sealing surface 2 is bent in the direction of the opposing surface 4 due to the pressure difference.

Figures 6A, 6B:
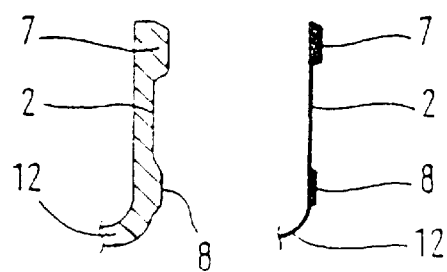
FIGS. 6 to 10 are fragmentary, longitudinal-sectional views of sealing surfaces with sealing elements.

The sealing surface 2 is shown in a longitudinal section in FIGS. 6A and 6B. The sealing surface has a flexurally rigid construction in FIG. 6A, so that no bending of the sealing surface 2 takes place due to the pressure difference between the high pressure P1 and the lower pressure P2. According to FIG. 6B, the sealing surface 2 is flexible, so that bending of the sealing surface 2 can occur due to the pressure difference (P1–P2).

Figures 7A, 7B:
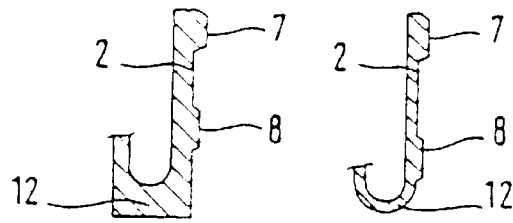

According to FIG. 7A, the connection region 12 of the sealing surface 2 relative to the deformation region 3 is constructed to be flexurally rigid with regard to the pressure difference between the high pressure P1 and the lower pressure P2. The representation according to FIG. 7B shows a flexible construction of the connection region 12.

Figures 8A, 8B, 8C, 8D, 8E:
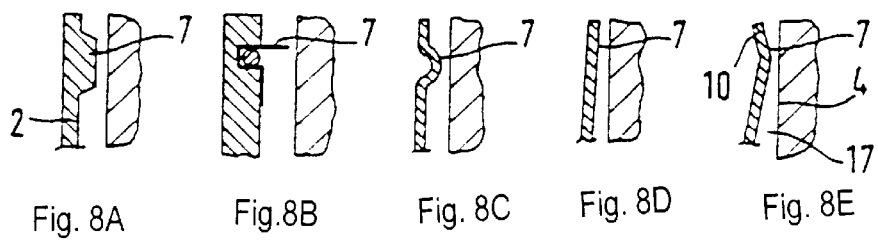

Each of FIGS. 8A to RE shows a structure of the outer sealing element 7. FIG. 8A shows a sealing element 7 which is web-shaped in cross section. According to FIG. 8B, a groove-shaped recess is disposed in the sealing surface 2, and caulked in place in this recess is a wire-shaped sealing tip which extends into the sealing gap 17. According to FIG. 8C, the sealing surface 2 has a sealing element 7 in the form of a bead projecting into the sealing gap 17. According to FIGS. 8D and 8E, the height S of the sealing gap 17 is reduced by a greater deformation of the outer marginal region 10 relative to the inner marginal region 11. The configuration (shaping) of the sealing surface 2 in FIG. 8E is selected in such a way that the sealing surface 2 deforms toward the sealing gap 17 in the outer marginal region 10.

Figures 9A, 9B, 9C:
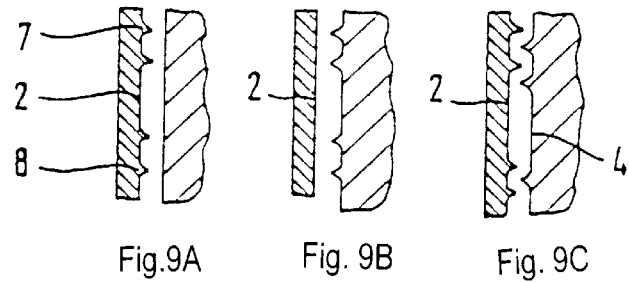

In FIGS. 9A, 9B and 9c, a pair of radially adjacent sealing tips 7, 8 are disposed on the outer marginal region 10 and the inner marginal region 11 of the sealing surface 2 or the opposing surface 4 in each case. According to FIG. 9C, both the sealing surface 2 and the opposing surface 4 in each case have two pairs of sealing tips 7, 8. In this case the latter engage one inside the other in pairs like a labyrinth seal in each case.

Figures 10A, 10B:
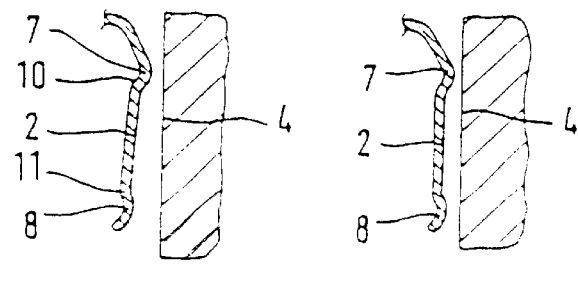

FIG. 10A shows a sealing surface 2 in which, in the non-deformed state, the inner marginal region 11 is clearly at a further distance from the opposing surface 4 than the outer marginal region 10. When a pressure difference is applied, the sealing surface 2 is deformed in such a way that the inner marginal region 11 is deformed to a markedly greater extent in the direction of the opposing surface 4 than the outer marginal region 10. Therefore, the height S1 of the sealing gap 17 at the inner marginal region is only slightly greater than the height S2 of the sealing gap 17 at the outer marginal region 10.

Figure 11:
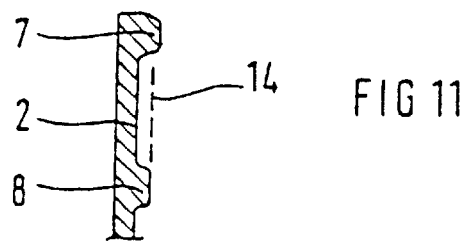
FIGS. 11 to 14 are fragmentary, longitudinal-sectional views of sealing surfaces with a gap-influencing element.
Figure 12:
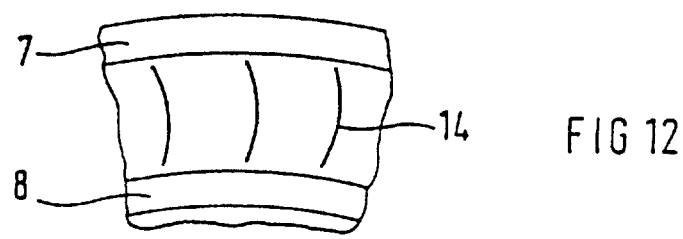

FIG. 11 shows a sealing surface 2 having an outer sealing element 7 and an inner sealing element 8 in a longitudinal section. A gap-influencing element 14 is provided between the sealing elements 7, 8. According to FIG. 12, the gap-influencing element is constructed as a swirl breaker, as seen in a plan view of the sealing surface 2 with the gap-influencing element 14. The swirl breaker influences the flow in order to combat gap excitation effects.

Figure 13:
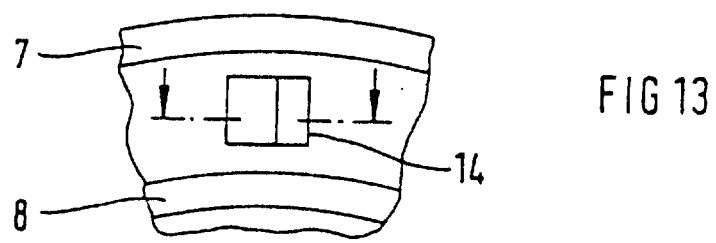
Figure 14:
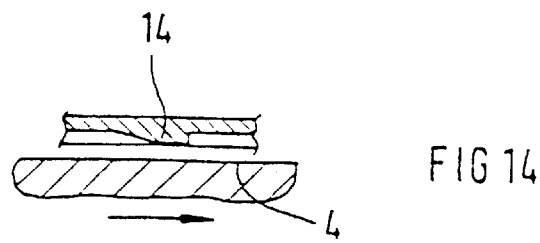

A plan view of the sealing surface 2 according to FIGS. 13 and 14 shows a hydrodynamically effective axial bearing surface which builds up an axial force due to a narrowing media-filled gap and thereby counteracts a further reduction in the height S of the sealing gap 17.

Bellows-shaped constructions of the deformation element 3 are shown in FIGS. 15 to 20. According to FIG. 15, the connection regions 12 of adjacent plates 15 of the deformation region 3 are constructed to be flexurally rigid relative to the pressure difference between the first pressure region 5 having a high pressure and the second pressure region 6 having a lower pressure.

Figure 16:
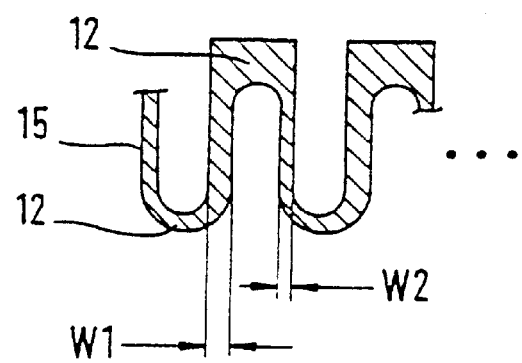

According to FIG. 16, an outer connection region 12 is constructed to be flexurally rigid and an inner connection region 12 having a smaller diameter is constructed to be flexible. In addition, plates 15 having a wall thickness W1 and plates 15 having a wall thickness W2 in the axial direction are disposed in an alternate manner in the axial direction. In this case, the wall thickness W1 is greater than the wall thickness W2. Of course, more than two different wall thicknesses and a different sequence of the plates of different thickness are also possible.

Figure 15:
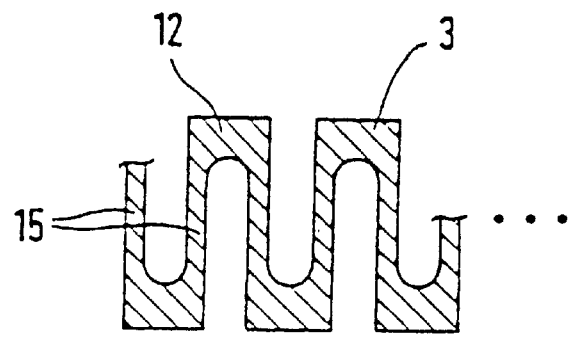
FIGS. 15 to 20 are longitudinal-sectional views of respective embodiments of a bellows-shaped deformation region.
Figure 17:
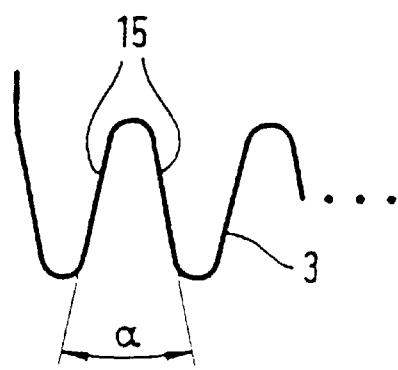

According to FIG. 17, plates 15 which are directly adjacent one another are not parallel to one another, as has been shown in FIGS. 15 and 16, but instead are inclined toward one another by an acute angle α within a range of 5° to 20°. The size of the angle α can be implemented in accordance with the demand imposed on the sealing configuration 1. For example, it may be predetermined by the operating conditions of a fluid-flow machine or a rotary machine, such as a turbogenerator.

Figure 18:
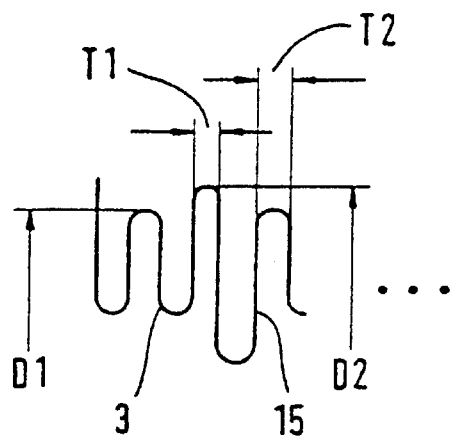

According to FIG. 18, the deformation region 3 has a plurality of plates 15 which may have different diameters. The diameters range between a maximum diameter D2 and a minimum diameter D1. Furthermore, the division of the deformation region 3 varies, i.e. a distance T1, T2 between adjacent pairs of plates 15 differs from one another.

Figure 19:
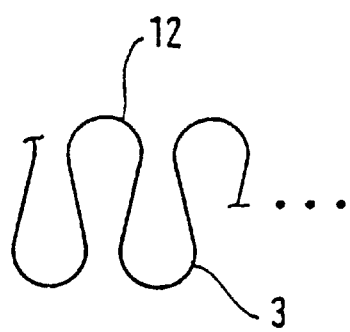
Figure 20:
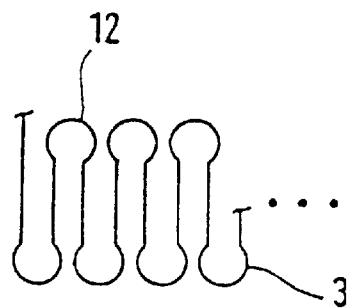

According to FIG. 19, the plates 15 are inclined toward one another, so that the connection region has a bulbous construction. According to FIG. 20, the plates 15 are disposed parallel to one another and the connection region is constructed approximately in a circular shape with a diameter greater than the distance between adjacent plates 15.

I claim:

1. A sealing configuration, comprising:
    first and second regions for at least one of conducting a fluid flow and being filled with a fluid, said regions to be sealed-off relative to one another and kept at different pressures forming a differential pressure;
    an opposing surface;
    a deformation region;
    a sealing surface connected to said deformation region and spaced apart from said opposing surface by a sealing gap, said sealing gap having a height to be set by a deformation of said deformation region as a result of a force exerted by said differential pressure; and
    at least one gap-influencing element disposed on at least one of said sealing surface and said opposing surface.

2. The sealing configuration according to claim 1, including at least one sealing element disposed on at least one of said sealing surface and said opposing surface and projecting into one of said sealing gap and said sealing surface.

3. The sealing configuration according to claim 2, wherein one of said regions has a low pressure, said sealing surface has a marginal region toward said low pressure, and said at least one sealing element is disposed at said marginal region.

4. The sealing configuration according to claim 2, wherein said at least one sealing element includes two sealing elements disposed at a distance from one another in a main gap direction corresponding to a differential-pressure-induced flow direction.

5. The sealing configuration according to claim 4, wherein one of said sealing elements reduces said gap height to a first height, and another of said sealing elements reduces said gap height to a second height differing from said first height.

6. The sealing configuration according to claim 1, wherein said at least one gap-influencing element is selected from the group consisting of a swirl breaker and a hydrodynamic bearing surface.

7. The sealing configuration according to claim 1, wherein at least one of said deformation region and said sealing surface is ring-shaped.

8. The sealing configuration according to claim 1, wherein said deformation region is bellows-shaped.

9. The sealing configuration according to claim 1, including a machine axis, said sealing gap extending in a sealing plane inclined relative to said machine axis by 70° to 110°, for sealing another gap extending along said machine axis.

10. The sealing configuration according to claim 1, wherein at least one of said deformation region and said sealing surface is formed of a material selected from the group consisting of a high-temperature-resistant steel,. a nickel-base alloy and a cobalt-base alloy.

11. The sealing configuration according to claim 1, wherein said sealing surface has a geometric configuration causing a deformation of said sealing surface to occur, as a result of a pressure difference at said sealing surface, for reducing said height of said sealing gap.

12. The sealing configuration according to claim 1, including a stationary machine component and a machine component rotatable about a machine axis, one of said sealing surface and said opposing surface disposed on said stationary machine component and the other of said sealing surface and said opposing surface disposed on said machine component rotatable about a machine axis.

13. The sealing configuration according to claim 12, wherein said stationary machine component and said machine component rotatable about a machine axis are parts of a rotary machine.

14. The sealing configuration according to claim 13, wherein said rotary machine is selected from the group consisting of a turbine, a compressor and a generator.

15. The sealing configuration according to claim 12, wherein said stationary machine component and said machine component rotatable about a machine axis are parts of a fluid-flow machine having a moving blade, and said opposing surface is disposed on said moving blade.

16. The sealing configuration according to claim 15, wherein said fluid-flow machine is a steam turbine.

17. The sealing configuration according to claim 12, wherein said stationary machine component and said machine component rotatable about a machine axis are parts of a fluid-flow machine having a guide blade, and said sealing surface is disposed on said guide blade.

18. The sealing configuration according to claim 17, wherein said fluid-flow machine is a steam turbine.

* * * * *